US009009020B1

(12) United States Patent
Oskin et al.

(10) Patent No.: US 9,009,020 B1
(45) Date of Patent: *Apr. 14, 2015

(54) AUTOMATIC IDENTIFICATION OF INTERESTING INTERLEAVINGS IN A MULTITHREADED PROGRAM

(75) Inventors: Mark H. Oskin, Seattle, WA (US); Peter J. Godman, Seattle, WA (US); Andrew M. Schwerin, Seattle, WA (US); Andrew J. Whitaker, Seattle, WA (US); Lucas M. Kreger-Stickles, Seattle, WA (US); Kaya Bekiroglu, Edmonds, WA (US)

(73) Assignee: F5 Networks, Inc., Seattle, WA (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/047,716

(22) Filed: Mar. 14, 2011

Related U.S. Application Data

(60) Provisional application No. 61/313,693, filed on Mar. 12, 2010, provisional application No. 61/313,692, filed on Mar. 12, 2010, provisional application No. 61/313,695, filed on Mar. 12, 2010.

(51) Int. Cl.
*G06F 9/45* (2006.01)
*G06F 9/455* (2006.01)

(52) U.S. Cl.
CPC ..................................... *G06F 9/455* (2013.01)

(58) Field of Classification Search
USPC ................................... 703/22, 2, 5; 717/127
See application file for complete search history.

(56) References Cited

U.S. PATENT DOCUMENTS

| 7,752,605 | B2 * | 7/2010 | Qadeer et al. | 717/127 |
|---|---|---|---|---|
| 8,200,474 | B2 * | 6/2012 | Wang et al. | 703/22 |
| 8,683,444 | B1 * | 3/2014 | Spycher et al. | 717/125 |
| 2005/0050305 | A1 * | 3/2005 | Kissell | 712/220 |
| 2009/0165006 | A1 * | 6/2009 | Ceze et al. | 718/102 |

OTHER PUBLICATIONS

Sen et al. "A Race-Detection and Flipping Algorithm for Automated Testing of Multi-Threaded Programs", Haifa Verification Conference, 2006, pp. 1-16.*
Damani et al., "Optimistic Recovery in Multi-threaded Distributed Systems" IEEE,1999, pp. 1-10.*
Flanagan et al. "FastTrack: Efficient and Precise Dynamic Race Detection",PLDI'09, Jun. 15-20, 2009, pp. 1-13.*
Yu et al. "A Case for an Interleaving Constrained Shared-Memory Multi-Processor" ISCA'09, Jun. 20-24, 2009, pp. 1-12.*
Tantikul et al. (A Communication-Induced Checkpointing and Asynchronous Recovery Algorithm for Multithreaded Distributed Systems, Springer-Verlag Berlin Heidelberg 2004).*

(Continued)

*Primary Examiner* — Omar Fernandez Rivas
*Assistant Examiner* — Iftekhar Khan
(74) *Attorney, Agent, or Firm* — Perkins Coie LLP

(57) ABSTRACT

A facility that for a multithreaded program executing on a root machine causes the threads of the program to be executed in a relative scheduling that produces an interesting result. The facility suspends execution of the program. The facility then tests a plurality of relative thread schedulings on one or more virtual machines and observes the result. Based upon the observed result the facility selects one of the tested relative thread schedulings. The facility then resumes execution of the program using the selected relative thread scheduling.

24 Claims, 12 Drawing Sheets

(56) References Cited

OTHER PUBLICATIONS

Scott D. Stoller("Model-Checking Multi-threaded Distributed Java Programs", Springer-Verlag Berlin Heidelberg 2000).*

Nettles, Scott M. And Jeannette M. Wing,"Persistence + Undoability = Transactions," School of Computer Science, Carnegie Mellon University, 12 pages, Aug. 30, 1991.

* cited by examiner

| time | thread 1 | thread 2 | thread 1 clock | thread 2 clock | location A clock | location B clock | location C clock |
|---|---|---|---|---|---|---|---|
| 0 | | | <0, 0> | | <0, 0> | <0, 0> | <0, 0> |
| 1 | x A | | <1, 0> | | <1, 0> | | |
| 2 | rd B | | <2, 0> | | | | |
| 3 | rd C | | <3, 0> | | | | |
| 4 | x A | | <4, 0> | | | | |
| 5 | | x A | | <4, 5> | <4, 0> | | |
| 6 | | wr C | | <4, 6> | | | <4, 6> |
| 7 | | wr B | | <4, 7> | | <4, 7> | |
| 8 | | x A | | <4, 8> | <4, 5> | | |

*FIG. 7*

AUTOMATIC IDENTIFICATION OF INTERESTING INTERLEAVINGS IN A MULTITHREADED PROGRAM

CROSS-REFERENCE TO RELATED APPLICATIONS

This application is related to the following applications, each of which is filed concurrently herewith and incorporated by reference in its entirety: U.S. patent application Ser. No. 13/047,713 entitled "IDENTIFYING A SET OF FUNCTIONALLY DISTINCT REORDERINGS IN A MULTITHREADED PROGRAM," and U.S. patent application Ser. No. 13/047,695 entitled "USING HINTS TO DIRECT THE EXPLORATION OF INTERLEAVINGS IN A MULTITHREADED PROGRAM.

This application claims the benefit of U.S. Provisional Patent Application No. 61/313,693, filed on Mar. 12, 2010, which is hereby incorporated by reference in its entirety.

This application is related to the following applications, each of which is incorporated by reference in its entirety: U.S. Provisional Patent Application No. 61/313,692 entitled "IDENTIFYING A SET OF FUNCTIONALLY DISTINCT REORDERINGS IN A MULTITHREADED PROGRAM;" and U.S. Provisional Patent Application No. 61/313,695 entitled "USING HINTS TO DIRECT THE EXPLORATION OF INTERLEAVINGS IN A MULTITHREADED PROGRAM."

This application is further related to the following applications, each of which is hereby incorporated by reference in its entirety: U.S. Provisional Application No. 61/013,019, filed Dec. 12, 2007; U.S. application Ser. No. 12/334,336, filed Dec. 12, 2008; U.S. Provisional Application No. 61/035,490, filed Mar. 11, 2008; and U.S. application Ser. No. 12/402,395, filed Mar. 11, 2009.

TECHNICAL FIELD

The described technology is directed to the field of software development and testing techniques, and, more particularly, to the field of debugging techniques.

BACKGROUND

A multithreaded program is a program that is capable of having two or more threads that can each be simultaneously executed by a different processor of a multiprocessor system or a different core of a multicore processor. Executing two or more threads of the program simultaneously can increase the processing speed of the program and/or the efficiency of the computer. Although each thread is executed by a single processor or core, it is common for threads to share other resources (e.g., memory) of the computer. As a result, two or more threads of a multithreaded program may access the same shared resource. For example, one thread may execute code that writes a value of a shared memory location at approximately the same time (e.g., shortly before or after) that another thread executes code that reads the shared memory location.

BRIEF DESCRIPTION OF THE DRAWINGS

FIG. 7 is a sample clock vector diagram that shows how the facility maintains clock vectors for a program's threads and memory locations accessed by them in some embodiments.

DETAILED DESCRIPTION

Figure 1:
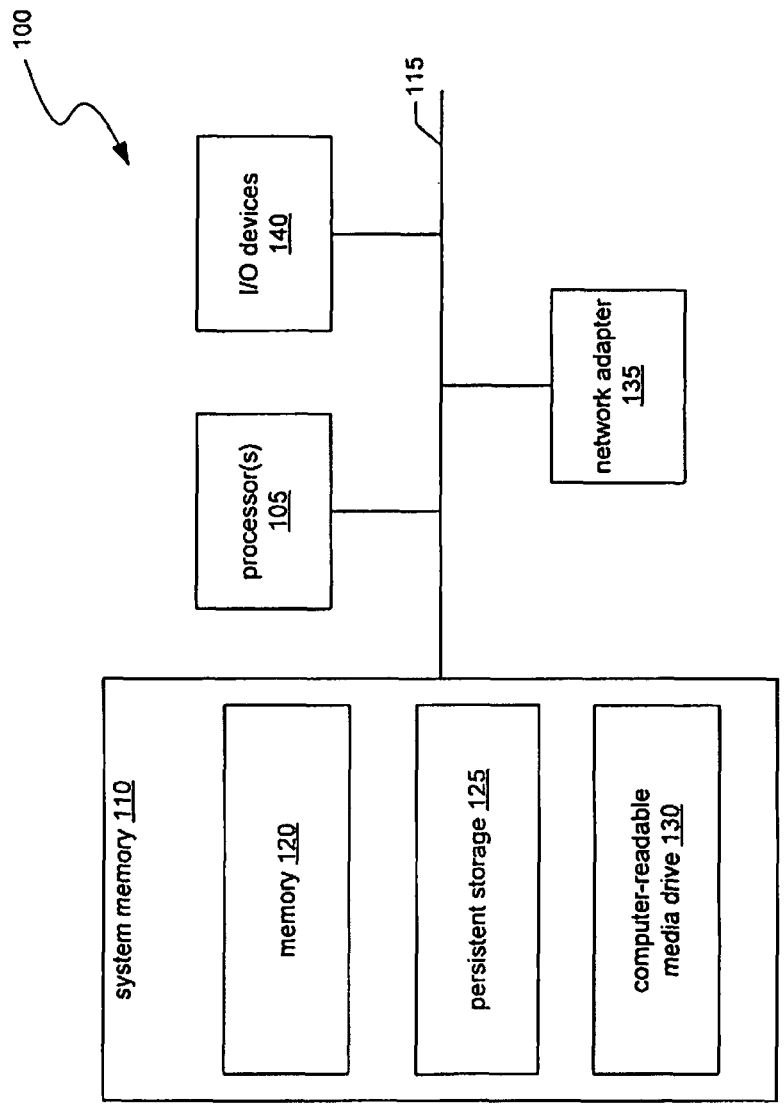
FIG. 1 is a block diagram showing an example architecture of a computing system 100 on which the facility executes in some embodiments.

The inventors have recognized that the different orders in which threads of a multithreaded program—or tasks of another type that are executing some sort of programmatic entity—access (e.g., read, write, etc.) one or more memory locations may produce different program behaviors or results, at least some of which are of interest to the developer of the multithreaded program. As one example, threads' access to a particular memory location in a particular order may cause a multithreaded program to crash or perform other undesirable behavior. Where the developer of the multithreaded program is able to detect this situation, the developer may wish to modify the multithreaded program code, such as by adding a synchronization mechanism to guarantee that the threads access the memory locations in an order that avoids this result, removing or modifying one of the accessing instructions, etc.

Accordingly, a hardware and/or software facility is described that explores different execution schedules for the threads of the program in which the threads access shared memory locations in different orders to identify thread execution schedules that produce interesting results, such as undesirable results. As used herein, the term "schedule" refers to any subset of potentially communicating memory accesses and the order in which those accesses are executed by threads of the multithreaded program. Potentially communicating memory accesses are two or more accesses, at least one of which is a write, that overlap in memory and are present in a program execution. In some embodiments, a schedule may define one or more pairs of potentially communication memory accesses to the same location (referred to herein as "interleavings"). These explorations of schedules by the facility are called "simulations." A group of simulations performed together is called a "simulation round."

Communication between threads can occur when a thread reads a memory location that was written by another thread or when a thread writes to a memory location that is subsequently read by another thread. Where multiple threads communicate by all accessing at least one same memory location in common, multiple schedules are possible. A schedule specifies an order in which different threads access one or more locations in common. A schedule typically specifies this order in a way that identifies the accesses of each thread. In various embodiments, a schedule further specifies the location accessed in each access operation; the type of each access operation (e.g., read, write, or exchange); the instruction at which each access is performed; an absolute or relative time at which each access is performed; and/or other related information. For example, where location A is the only communicating location and thread 1 writes location A once and thread 2 reads location A once, two schedules are possible: {<location A, thread 1>, <location A, thread 2>}—meaning that thread 1 writes location A before thread 2 reads location A—and A{<location A, thread 2>, <location A, thread 1>}—meaning that thread 2 reads location A before thread 1 writes location A. The facility's exploration of different thread execution schedules in a simulation round involves selecting a number of "paths" for execution as individual simulations in simulation round, where each path is a combination of one possible interleaving for each of multiple locations. Continuing the example, where location A is accessed as described above and location B is written once by thread 2 and once by thread 3, the 24 possible schedules may be:

{<location A, thread 1>, <location A, thread 2>, <location B, thread 2>, <location B, thread 3>}
{<location A, thread 1>, <location A, thread 2>, <location B, thread 3>, <location B, thread 2>}
{<location A, thread 1>, <location B, thread 2>, <location A, thread 2>, <location B, thread 3>}
{<location A, thread 1>, <location B, thread 2>, <location B, thread 3>, <location A, thread 2>}
{<location A, thread 1>, <location B, thread 3>, <location A, thread 2>, <location B, thread 2>}
{<location A, thread 1>, <location B, thread 3>, <location B, thread 2>, <location A, thread 2>}
{<location A, thread 2>, <location A, thread 1>, <location B, thread 2>, <location B, thread 3>}
{<location A, thread 2>, <location A, thread 1>, <location B, thread 3>, <location B, thread 2>}
{<location A, thread 2>, <location B, thread 2>, <location A, thread 1>, <location B, thread 3>}
{<location A, thread 2>, <location B, thread 2>, <location B, thread 3>, <location A, thread 1>}
{<location A, thread 2>, <location B, thread 3>, <location A, thread 1>, <location B, thread 2>}
{<location A, thread 2>, <location B, thread 3>, <location B, thread 2>, <location A, thread 1>}
{<location B, thread 2>, <location A, thread 1>, <location A, thread 2>, <location B, thread 3>}
{<location B, thread 2>, <location A, thread 1>, <location B, thread 3>, <location A, thread 2>}
{<location B, thread 2>, <location A, thread 2>, <location A, thread 1>, <location B, thread 3>}
{<location B, thread 2>, <location A, thread 2>, <location B, thread 3>, <location A, thread 1>}
{<location B, thread 2>, <location B, thread 3>, <location A, thread 1>, <location A, thread 2>}
{<location B, thread 2>, <location B, thread 3>, <location A, thread 2>, <location A, thread 1>}
{<location B, thread 3>, <location A, thread 1>, <location A, thread 2>, <location B, thread 2>}
{<location B, thread 3>, <location A, thread 1>, <location B, thread 2>, <location A, thread 2>}
{<location B, thread 3>, <location A, thread 2>, <location A, thread 1>, <location B, thread 2>}
{<location B, thread 3>, <location A, thread 2>, <location B, thread 2>, <location A, thread 1>}
{<location B, thread 3>, <location B, thread 2>, <location A, thread 1>, <location A, thread 2>}
{<location B, thread 3>, <location B, thread 2>, <location A, thread 2>, <location A, thread 1>}

In some embodiments, to cause the threads to access an identified memory location in a different order as part of pursuing a particular path than an individual simulation, the facility suspends the execution of one or more threads. For example, in response to a thread requesting to access an identified memory location, the facility may suspend the thread's execution for a period of time determined to be adequate for another thread to access the identified memory location. As another example, in response to a thread requesting to access an identified memory location, the facility may suspend the thread's execution until another thread actually accesses the selected memory location. In some embodiments, if another thread has not accessed the selected memory location within a threshold period of time, the facility determines that the reordering was unsuccessful. Typically, a reordering is unsuccessful when the multithreaded program includes a synchronization mechanism to control the threads' access to selected memory location. If the facility identifies a successful reordering for a selected memory location, then the facility determines that the threads' access to the selected memory location is not controlled and, as a result, the program may behave unpredictably or crash.

In some embodiments, the facility selects an execution point from which, or after which, the facility attempts to perform a round of simulations to reorder the threads' access to one or more identified memory locations. At the selected execution point, the facility captures and saves the state of the multithreaded program and the state of the "root machine" on which the program is executing. This state is collectively referred to herein as the "saved state." The saved state includes the state necessary to execute the multithreaded program from the selected execution point. For example, the initial state may include: control registers, general purpose registers, floating point registers, data registers, program counters, flags, the address space of the multithreaded program (e.g., the page table, stack, heap, etc.), the state of emulated or physical devices (e.g., clocks, network, storage, I/O, timers, network interface card, or advanced programmable interrupt controller etc.), or the like. After the facility captures a saved state, the facility enters into a period of simulation in which a number of different paths are explored beginning at the saved state.

In some embodiments, to simulate execution of the multithreaded program from the initial state, the facility initializes a virtual machine with the entire saved state. The facility observes execution of the multithreaded program from the selected execution point within the virtual machine to identify one or more memory locations that are accessed by two or more threads. The facility may initialize the same or another virtual machine with the saved state and deterministically execute the multithreaded program to reorder the threads' access to at least one of the identified memory locations, and thus simulate a different path.

In some embodiments, to simulate execution of the multithreaded program from the saved state, the facility performs speculative execution using a copy-on-write ("COW") strategy. That is, instead of initially initializing the virtual machine with the entire saved state, the facility waits for a thread to perform an access operation that would change a region of memory in the saved state, and in response creates a copy of the region of memory and the access operation is performed on the copied region. When a COW strategy is used to simulate execution, the facility is able to perform multiple simulations to explore multiple schedules because the saved state is left unchanged.

After the facility has conducted a number of different simulations in a simulation round, the facility selects one of the simulations based on judging it the most interesting. The facility "retires" the selected simulation by causing the root machine to resume executing the program from the saved state while imposing the path used in the selected simulation. The facility may also or instead "package" the selected simulation for later replay on the same or another virtual machine. In some embodiments, rather than considering for simulation all possible paths—that is, every possible combination of different schedules—the facility considers only paths that include a functionally distinct set of possible schedules by eliminating possible schedules that are functionally equivalent with possible schedules in the functionally distinct set. In particular, in such embodiments, the facility employs a system of vector clocks that track, throughout the course of a simulation, for each thread, the most recent state of each of the other threads that it could have been made aware of by communications from the other thread. In maintaining such vector clocks, the facility regards any write to an address by a first thread that is followed by a read from the same address by a second thread as a communication from the first thread to the second thread. Each update to a clock component of a first thread regarding a communication from a second thread that is completed in a particular read instruction executed by the first thread is said to establish a reorderability window of the second thread with respect to the location read by the completing read instruction. For each reorderability window established in this way by the facility, it identifies as a functionally distinct reordering any reordering that reconstitutes a reordering between the completing read instruction of the second thread and the write instructions for the same location by the first thread that are within the window.

In some embodiments, the facility exhaustively explores the minimized set of possible schedules, conducting a separate simulation for each path that can be constructed from the functionally distinct set of schedules. In some embodiments, the facility explores the paths through the functionally distinct reorderings incompletely. As an example, in some embodiments, the facility randomly selects fewer than all such paths. As another example, in some embodiments, the facility actively identifies promising paths among these based upon explicit hints included in the program by its developer that identify points or regions in the code that the developer expected to be interesting to explore. The facility observes, during the foregoing simulation, which points or regions identified by hints were executed. The facility then selects one or more schedules proximate to the identified points and regions to perturb in the path for the prior simulation to arrive at the path for the next simulation.

In some embodiments, the facility attributes a "retirement score" to each simulation in a simulation round these as a basis for selecting the simulation from the simulation round to retire or replay. In some embodiments, a simulation's retirement score is based upon whether a crash or other error was encountered during the simulation, including processor faults such as a general protection fault, a divide by zero exception, accessing a null pointer, etc. In some embodiments, a simulation's retirement score is based upon explicit hints included in the program by its developer. As one example of hints, the developer can include one or more assertions in the program. Each assertion specifies a condition that the developer always expects to be true when execution reaches the point in the program where the assertion is placed. In some embodiments, whether the condition specified by one of these assertions evaluates as false during a simulation contributes to the simulation's retirement score. As another example of hints, the developer can include specialized function calls or other constructs that identify a point in the program or a region in the program as being interesting, such as points or regions that contain error-prone code or are otherwise sensitive. In some embodiments, the number and/or weight of interesting points and sections encountered by the simulation contributes to the simulation's retirement score. In some embodiments, when a simulation round is completed, the facility selects the simulation having the highest retirement score to be retired and/or replay. In some embodiments, as soon as a simulation is completed whose retirement score exceeds a predetermined threshold, but simulation round is terminated and the simulation question is retired and/or replayed.

In some embodiments, the facility provides a mechanism for delivering at least some types of interrupts to simulations executing on a virtual machine—such as inter-processor interrupts ("IPIs") and timer device interrupts ("TDIs")—and/or permits simulations to continue to execute in the virtual machine through the invocation of an interrupt handler after an interrupt of one of these types occurs. In some embodiments, the facility provides such a mechanism by providing a synthetic advanced programmable interrupt controller ("APIC") that sends and receives IPIs, and/or by providing virtual timers to generate TDIs.

By operating in some or all of the ways described above, the facility enables developers to more efficiently and/or effectively identify interesting schedules in a multithreaded program, such as schedules that surface concurrency defects.

FIG. 1 is a block diagram showing an example architecture of a computing system 100 on which the facility executes in some embodiments. Certain well-known structures and functions have not been shown or described in detail to avoid obscuring the description. The computing system 100 includes one or more processors 105 and memory 110 coupled to an interconnect system 115. The processors 105 are the central processing units ("CPUs") of the computing system 100 and, thus, control its overall operation. In some embodiments, the processors 105 accomplish this by executing software stored in memory 110. In some embodiments, the computing system 100 has at least one processor 105 having two or more independent cores in a package composed of a single integrated circuit (referred to as a "die"), one or more dies packaged together, multiple packages, and so on. In some embodiments, the computing system 100 has at least one hyper-threaded processor 105 that, despite having only a single core, is capable of performing as a multi-core processor. A processor 105 may be, or may include, one or more programmable general-purpose or special-purpose microprocessors, digital signal processors ("DSPs") programmable controllers, application specific integrated circuits ("ASICs"), programmable logic devices ("PLDs"), or the like, or a combination of such devices.

The interconnect system 115 shown in FIG. 1 is an abstraction that represents any one or more separate physical buses and/or point-to-point connections, connected by appropriate bridges, adapters and/or controllers. The interconnect system 115 may include, for example, a system bus, a form of Peripheral Component Interconnect (PCI) bus, a HyperTransport or industry standard architecture (ISA) bus, a small computer system interface (SCSI) bus, a universal serial bus (USB), an Institute of Electrical and Electronics Engineers (IEEE) standard 1394 bus (sometimes referred to as "Firewire"), and so on.

System memory 110 includes a memory 120 for storing programs and data while they are being used; a persistent storage device 125, such as a hard drive, for persistently storing programs and data; and a computer-readable media drive 130, such as a CD-ROM or DVD-ROM drive, for reading programs and data stored on a computer-readable medium. As used herein, system memory 110 includes any form of volatile, nonvolatile, removable, and non-removable media, or any combination of such media devices that are capable of storing information such as computer-readable instructions, data structures, program modules, and other data of the computing system 100.

Also connected to the processors 105 through the interconnect system 115 is a network adapter 135 and one or more input devices and output devices ("I/O devices") 140. The network adapter 135 provides the computing system 100 with the ability to communicate with other computing systems over a network and may be, for example, an Ethernet adapter. The I/O devices 140 provide a user of the computing system 100 with the ability to access programs and data stored in system memory 110. For example, I/O devices 140 may include input devices such as a keyboard, pointing device, microphone, etc., and output devices such as a display device, speakers, a printer, and so on.

While computing systems configured as described above are typically used to support the operation of the facility, those skilled in the art will appreciate that the facility may be implemented using devices of various types and configurations, and having various components.

Figure 2:
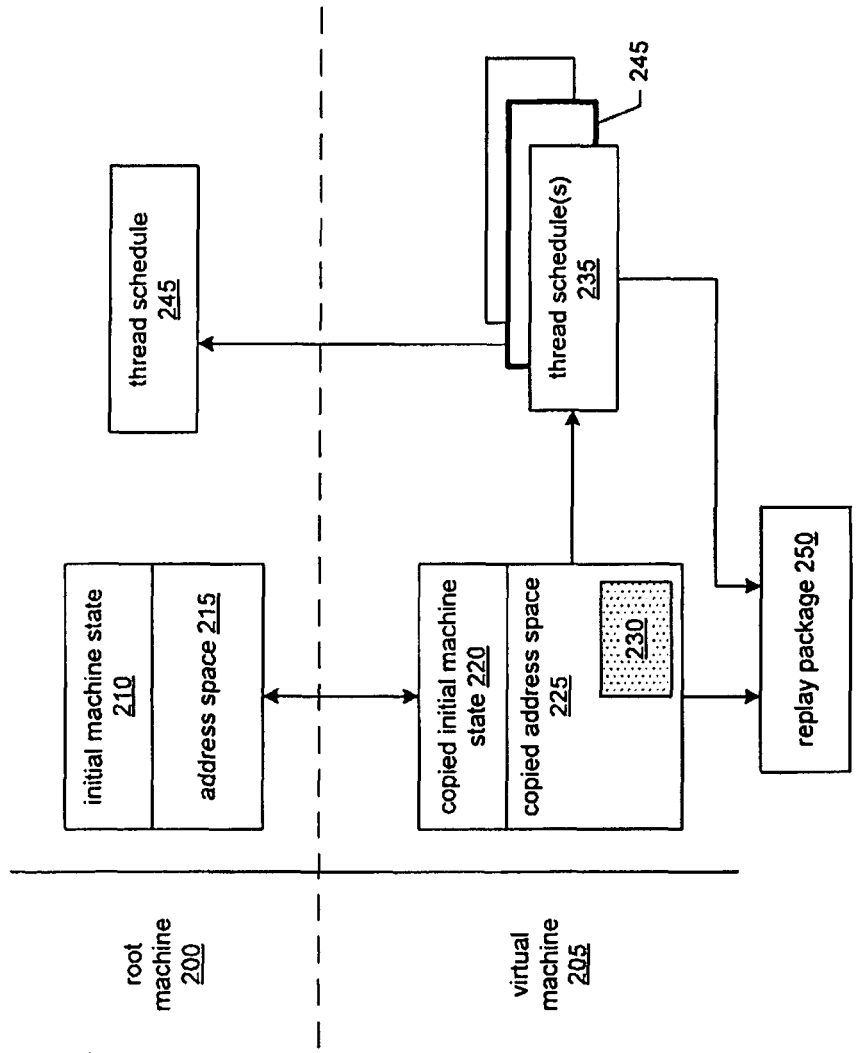
FIG. 2 is data flow diagram depicting the exploration and retirement performed by the facility in some embodiments.

FIG. 2 is data flow diagram depicting the exploration and retirement performed by the facility in some embodiments. In the illustrated embodiment, the facility includes a root machine 200 and a virtual machine 205. The root machine 200 may be a physical machine or a virtual machine. The root machine 200 executes a multithreaded program (not shown), while the virtual machine 205 is used to explore various schedules of the threads of the multithreaded program. In some embodiments, at arbitrary and/or specified points in execution, the facility pauses execution of the multithreaded program on the root machine 200 to explore various schedules and determine whether a replay package should be generated for one or more explored schedules. While execution of the multithreaded program is paused, the facility captures the state 210 of the root machine 200 and the address space 215 of the multithreaded program. The address space 215 of the multithreaded program is unchanged while execution of the multithreaded program is paused. The virtual machine 205 is initialized with a copy 220 of the machine state 210 and a copy 225 of the address space 215 of the multithreaded program. The virtual machine 205 simulates execution of the multithreaded program to identify one or more memory locations accessed by at least two threads. For at least one identified memory location, the virtual machine 205 attempts to reorder the threads' access to the identified memory location. For one or more of the attempted reorderings ("explored schedules"), the facility maintains a record of the regions of memory 230 accessed by the threads and the path 235. One or more of the paths 235 are included in a replay package 250 together with the copied machine state and the regions of memory 230 accessed by the threads. The regions of memory 230 that are included in the replay package 250 have the same contents as the corresponding regions of memory at the time that the multithreaded program was paused. The regions of memory 230 that are included in the replay package 250 may be copied to the replay package 250 from the address space 215 or 225 a variety of ways. For example:

In some embodiments, while simulating execution of the multithreaded program on the virtual machine 205, the facility speculatively executes the multithreaded program using a copy-on-write ("COW") strategy. In response to a thread's request to write to a memory location, the facility creates a copy of the region of memory that contains the memory location and the write operation is performed on the copied region. When a COW strategy is used to simulate execution, the facility is able to perform multiple simulations to explore multiple schedules because the copied address space 225 is left unchanged. For each explored schedule, the facility maintains a record of the regions of memory accessed (e.g., read, written, etc.) by threads of the multithreaded program. For each explored schedule that is included in the replay package 250, the facility includes a copy of the regions of memory 230 from the address space 215 or 225. In some embodiments, if multiple explored schedules are included in the replay package 250, the facility includes the union of the regions of memory accessed by the threads to perform each of the explored schedules.

In some embodiments, while simulating execution of the multithreaded program on the virtual machine 205, the facility executes the multithreaded program using a copy-on-access ("COA") strategy. In response to a thread's request to access (e.g., read, write, etc.) a location within a region of memory, the facility determines whether the request is the first request to access any location within the region memory. If the request is the first request, the facility creates a copy of the region of memory 230 from the address space 215 or 225 before the access operation is performed. If the simulation is included in the replay package 250, the copied regions of memory 230 are included in the replay package 250. In some embodiments, if multiple simulations are performed using the COA strategy, the facility includes the union of the regions of memory accessed by the threads for each of the simulations included in the replay package 250.

In some embodiments, a selected path 245 is "retired" on the root machine 200 by deterministically executing the multithreaded program on the root machine 200 in accordance with the path 245.

Figure 3:
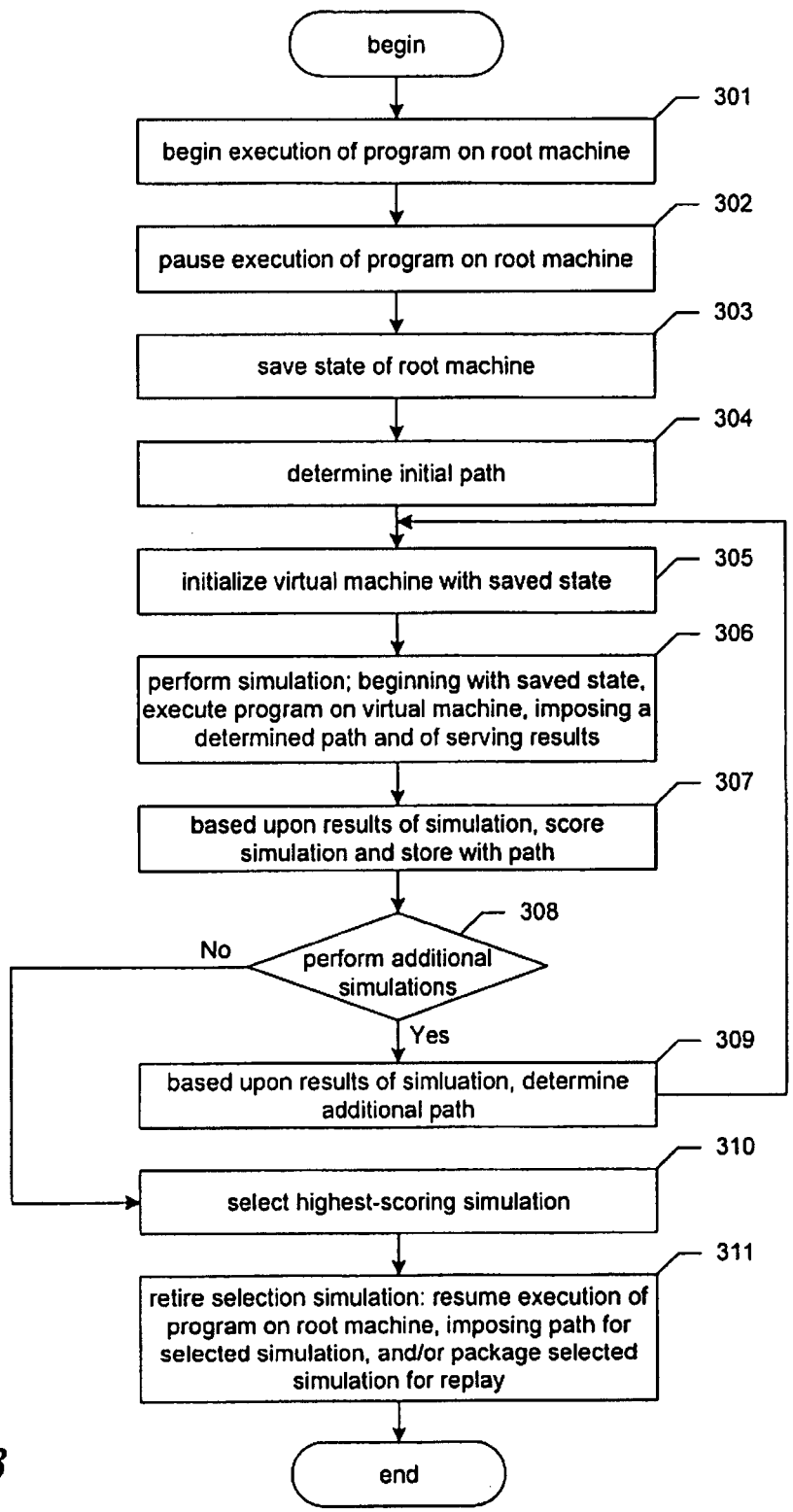
FIG. 3 is a flow diagram showing steps typically performed by the facility to conduct a simulation round and retirement in some embodiments.

FIG. 3 is a flow diagram showing steps typically performed by the facility to conduct a simulation round and retirement for a multithreaded program in some embodiments. In step 301, the facility begins execution of the program on the root machine. In some embodiments, the root machine is a physical machine, while in other embodiments the root machine is a root virtual machine. In step 302, the facility pauses execution of the program on the root machine. In step 303, the facility saves the state of the root machine. In some embodiments, the state saved in step 303 includes all programmer visible registers (e.g., the control register, the general purpose registers, and the floating point register), the stack, the heap, and the page table. In some embodiments, step 303 includes saving the state persistently, such as on hard disk. In step 304, the facility determines an initial path to use in the first simulation of the simulation round. In some embodiments, the path determined by the facility of step 304 is the path that results from permitting the program to execute in a natural order, without artificially suspending execution of any of the program's threads for the purpose of perturbing the execution schedule of the threads. In some embodiments, the facility uses information determined in or from past simulation rounds for the same program in order to determine in step 304 an initial path other than the natural path. In step 305, the facility initializes a virtual machine using the state saved in step 302. In some embodiments, the state is initialized with the saved state using a hypercall interface that alters the state of the virtual machine in a predefined way (e.g., by placing values in registers, program counters, etc.) and then performs an action that causes a transfer of control to the virtual machine monitor (e.g., a VMEXIT). When the virtual machine monitor runs it examines the state of the machine and uses this to determine what action to perform on behalf of the virtual machine. In step 306, the facility performs a simulation by, beginning with the saved state with which the virtual machine was initialized in step 305, executing the program on the virtual machine, imposing a determined path and observing the results. Because this execution begins with the saved state of the root machine, this execution begins at the point at which the program was paused on the root machine. For example, the program counter for each thread at the time the program is executed on the virtual machine is the same as the program counter that was saved on the physical machine. Details of step 306 are described in greater detail below in connection with FIGS. 4-7. In step 307, based upon the results of the simulation conducted in step 306, the facility attributes to the simulation a retirement score reflecting the strength of the simulation's candidacy for the simulation that will be retired or packaged for replay. In step 307, the facility further stores the attributed score, together with information defining the path pursued during the simulation. Details of step 307 are discussed in greater detail below in connection with FIG. 10. In step 308, if additional simulations are to be performed as part of the current simulation round, then the facility continues in step 309, else the facility continues in step 310. In step 309, based upon the results of the simulation, the facility determines an additional path to explore in future simulation of the round. Details of step 307 are discussed in greater detail below in connection with FIGS. 10-12. After step 309, the facility continues in step 305 to begin the next simulation. In step 310, the facility selects the simulation of the round that received the highest retirement score in step 307. In step 311, the facility retires the selected simulation by resuming execution of the program of the root machine, imposing a path pursued in the simulation selected in step 310. Additionally or alternatively, in step 311, the facility packages the simulation selected in step 310 for replay. Additional details about such packaging and replay are provided in U.S. Provisional Patent Application No. 61/393,691 entitled "DETERMINISTIC REPLAY PACKAGE," filed on Mar. 12, 2010, hereby incorporated by reference in its entirety. During either retirement or replay, the execution of the program consistent with the path of the selected simulation can be observed using a debugger or a variety of other tools to identify and analyze events of interest that occur when the program is executed consistent with the path of the selected simulation. After step 311, these steps conclude.

While FIG. 3 shows the use of only a single virtual machine to perform simulations, in some embodiments, the facility uses multiple virtual to simultaneously perform different simulations. These multiple virtual machines may execute on the same or different physical machines.

Those skilled in the art will appreciate that the steps shown in FIG. 3 and in each of the flow diagrams discussed below may be altered in a variety of ways. For example, the order of the steps may be rearranged; some steps may be performed in parallel; shown steps may be omitted, or other steps may be included; etc.

Figure 4:
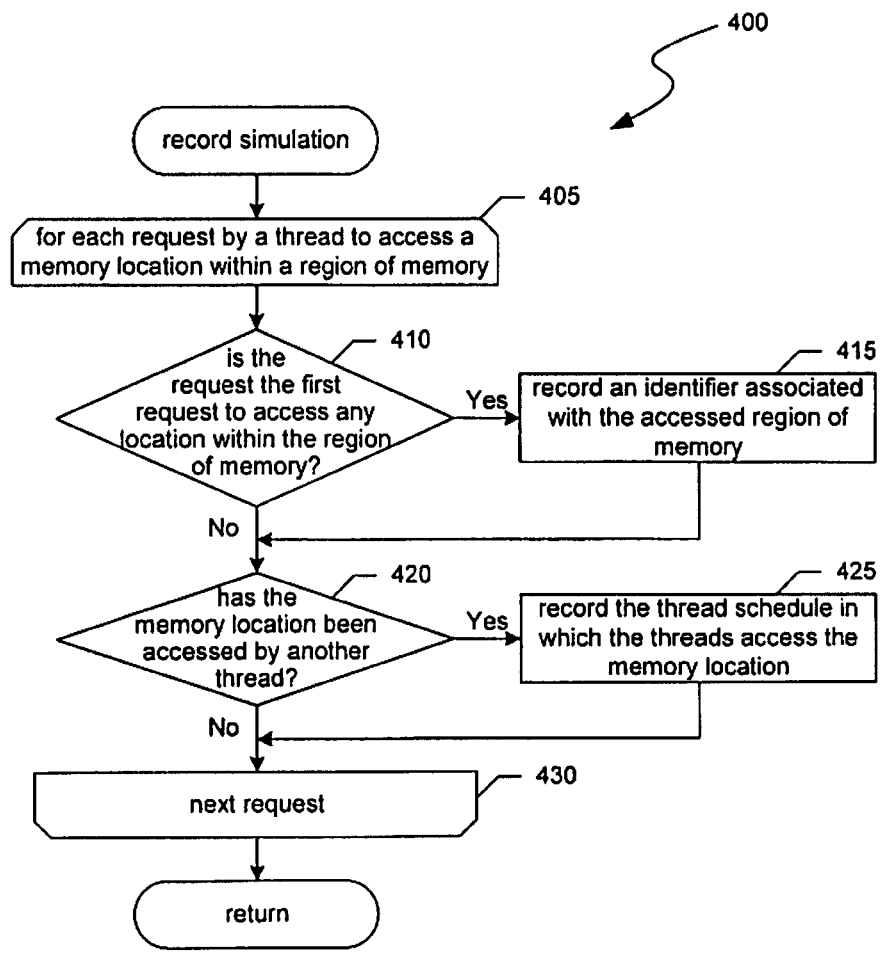
FIG. 4 is a flow diagram showing steps performed by the facility in one or more embodiments to record a journal describing a simulation of a multithreaded program.

FIG. 4 is a flow diagram showing steps performed by the facility in one or more embodiments to record a journal describing a simulation of a multithreaded program. In some embodiments, the facility records a journal by trapping thread requests to perform access operations before the access operations are actually performed. An access operation can be a read, a write, or more complex operation such as an operation to acquire or release a synchronization mechanism, which may be treated as both a read and a write.

The facility loops through steps 405-430 for each request by a thread of the multithreaded program to access a memory location within a region of memory. FIG. 4 can be better understood in the context of FIG. 5 and the table listed below, which shows the regions of memory accessed as a result of the operations shown in FIG. 5. In various embodiments, those regions are pages of memory, pages in the page table, or portions of pages, such as quarter-pages, cache lines, or words.

| location | memory region | accessed? |
|---|---|---|
| A, B, C | 1 | Yes |
| D | 2 | Yes |
| E, F, G | 3 | No |
| H | 4 | No |
| W, X, Y, Z | 5 | Yes |

Figure 5:
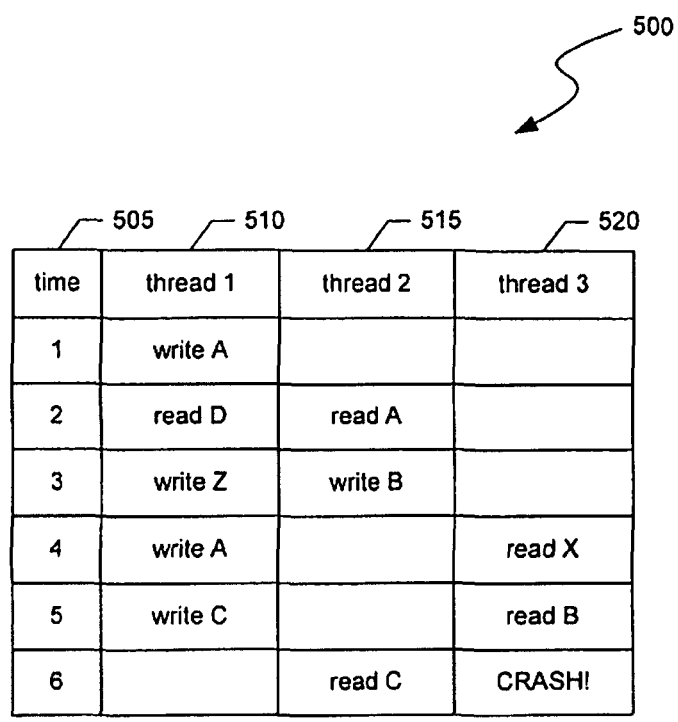
FIG. 5 is a diagram showing access operations performed by each thread as the multithreaded program executes over a period of time.

FIG. 5 is a table diagram showing access operations performed by each thread as the multithreaded program executes over a period of time. To facilitate description, the table 500 is indexed by a time column 505. Columns 510, 515 and 520 list the access operations performed by thread 1, thread 2, and thread 3, respectively. These columns do not show operations executed by the threads that are not access operations. Thread 1 executes access operations at times 1, 2, 3, 4, and 5; thread 2 executes operations at times 2, 3, and 6; and thread 3 executes access operations at times 4 and 5. The facility loops through steps 405-430 for each access operation shown in FIG. 5. For example, at time 1, the facility loops through steps 405-430 for the access operation ("write A") performed by thread 1. As another example, at time 4, the facility loops through steps 405-430 for the access operation ("write A") performed by thread 1 and the access operation ("read X") performed by thread 3.

While FIG. 5 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Returning to FIG. 4, in step 405, the facility traps a request by a thread to access a memory location within a region of memory. For example, at time 1, the facility traps the access operation ("write A") that is to be performed by thread 1. In step 410, the facility determines whether the request is the first request to access any location within the region of memory. If the request is the first request to access any location within the region of memory, then the facility continues at step 415; else the facility continues at step 420. In step 415, the facility records an identifier associated with the accessed region of memory to identify that the region of memory has been accessed by a thread of the multithreaded program. For example, a region identifier of an accessed region may be recorded in a table or other data structure. As another example, the facility can mark a region as accessed in response to a thread requesting to access a location within the region. In some embodiments, instead of or in addition to recording an identifier associated with the accessed region of memory, the facility creates a copy of the region of memory before the access operation is performed. If the simulation is included in the replay package, the copied regions of memory are included in the replay package. In the example illustrated in FIG. 5, the facility determines that memory region 1 is first accessed by thread 1 at time 1; memory region 2 is first accessed by thread 1 at time 2; and memory region 5 is first accessed by thread 1 at time 3. Each of these access operations are trapped by the facility and an identifier associated with the accessed region is recorded in step 415. In the example illustrated in FIG. 5, the remaining instructions are trapped and the facility determines that the requested locations are within regions of memory previously accessed. For example, for the access operation ("write B") performed by thread 2 at time 3, the facility determines that the requested location ("B") is not the first access to the region of memory (region 1), in which case, the facility continue at step 420.

In step 420, the facility determines whether the requested memory location has been accessed by another thread during the simulation. If the memory location has been accessed by another thread, the facility continues at step 425; else the facility continues at step 430. To determine whether a memory location has been accessed by another thread, the facility may maintain a list of each memory location that has been accessed during the simulation, for example. In step 425, the facility records the order in which the threads accessed the memory location ("schedule order"). For example, for the access operation performed at time 2 by thread 2, the facility determines that memory location A has been previously accessed by thread 1. In this example, in step 425 for the access operation performed at time 2 by thread 2, the facility records the schedule order for memory location A as A(1, 2). As another example, in step 425 for the access operation performed at time 4 by thread 1, the facility records the schedule order for memory location A as A(1, 2, 1). As yet another example, in step 425 for the access operation performed at time 5 by thread 3, the facility records the schedule order for memory location B as B(2, 3).

In step 430, the facility determines whether the simulation is complete. For example, the facility may determine that a simulation is complete if the multithreaded program crashes. As another example, the facility may determine that a simulation is complete if the multithreaded program reaches an unexpected state. As yet another example, the facility may determine that a simulation is complete if the multithreaded program ends. If the simulation is not complete, the facility continues at step 405 to trap the next access operation; else, the process 400 ends.

In some embodiments, the schedule is the subset of potentially communicating accesses in the order in which those accesses are executed by the threads of a multithreaded program. For example, the schedule illustrated in FIG. 5 is {<location A, thread 1>, <location A, thread 2>, <location B, thread 2>, <location A, thread 1>, <location C, thread 1>, <location B, thread 3>, <location C, thread 2>}.

Figure 6:
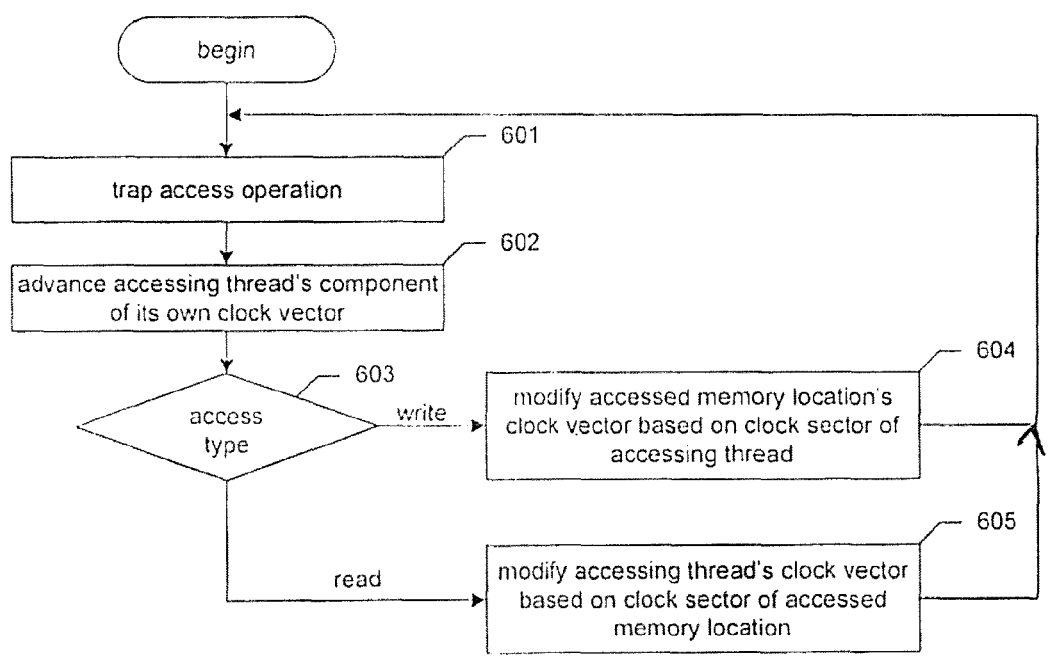
FIG. 6 is a flow diagram showing steps typically performed by the facility in some embodiments to maintain clock vectors for the program's threads and memory locations accessed by the program's threads during a single simulation of the program.

FIG. 6 is a flow diagram showing steps typically performed by the facility in some embodiments to maintain clock vectors for the program's threads and memory locations accessed by the program's threads during a single simulation of the program. In step 601, the facility traps an access operation to an accessed memory location by an accessing thread. In some embodiments, the facility performs this trapping in a hypervisor on top of which the program is executing. In various embodiments, the facility performs this trapping inside the operating system kernel, or in the processor. In some embodiments, the facility performs this trapping when the thread reaches the access operation, but before the access operation is actually completed. In some embodiments, the access operation can be a read, a write, or a more complex operation such as an operation to acquire or release a synchronization mechanism, which is treated as both a read and a write. In various embodiments, operations treated by the facility as both read and write include operations such as atomic compare and swap instructions. In some embodiments, this trapping is performed only with respect to certain memory access operations, such as memory access operations with respect to memory locations in certain memory pages or memory words. The remaining steps of FIG. 6 can be better understood in the context of FIG. 7.

FIG. 7 is a sample clock vector diagram that shows how the facility maintains clock vectors for a program's threads and memory locations accessed by them in some embodiments. The clock vector diagram comprises a table 700 that indicates, as the simulation progresses, the state of clock vectors 714-715 of the program's two threads and the state of clock vectors 716-718 of the memory locations accessed by the threads. The table is indexed by an absolute time column 711. In some embodiments (not shown), the facility makes no effort to maintain an absolute time, and simply uses a system of local times that is local to each thread. Columns 712-713 show the memory access instructions executed by thread 1 and thread 2, respectively. These columns do not show instructions executed by the threads that are not memory access instructions. From these columns, it can be seen that no thread executes a memory access instruction at time 0. Thread 1 executes memory access instructions at times 1-4; and thread 2 executes memory access instructions at times 5-8. Each clock vector contains two components each corresponding to one of the threads. For example, in the clock vector state <4, 6> occurring at time 6 in column 715, the first component, 4, corresponds to thread 1; and the second component, 6, corresponds to thread 2. In particular, this state of the clock vector for thread 2 indicates that, at time 6, based upon memory access operations performed by the threads up until time 6: it is possible that thread 2 has been influenced by processing of thread 1 up through the memory access instruction at time 4; and it is possible that thread 2 has been influenced by its own processing through the memory access instruction at time 6. Where the state of a particular clock vector does not change at a particular time, the box at that time in the clock vector's column is blank. For example, because the state of the clock vector for location A does not change at time 2, the box at time 2 in column 715 is blank, which should be understood to mean that the clock vector for location A at time 2 remains <1, 0> from time 1.

Returning to FIG. 6, in step 602, the facility advances the accessing thread's component of its own clock vector to reflect the advancement of absolute time. As an example, for the memory access instruction performed by thread 1 at time 2, the clock vector for accessing thread 1 in column 715 is changed from <1, 0> to <2, 0>, such that its first component corresponding to accessing thread 1 is set equal to time 2.

Returning to FIG. 6, in step 603, the facility determines the type of memory access operation that the accessing thread is performing; if the performed access operation is a write (shown as "wr" in FIG. 7), then the facility continues in step

604; if the performed access operation is a read (shown as "rd" in FIG. 7), then the facility continues in step 605. As mentioned above, the facility treats some complex memory access operations, such as the exchange operation (shown as "x" in FIG. 7) as both a read and a write, and so continues at both step 604 and step 605.

In step 604 where the access operation is a write, the facility modifies the clock vector for the accessed memory location based upon the clock vector of the accessing thread. In particular, the facility sets the clock vector for the accessed memory location to be the component-wise maximum of the current clock vector for the accessed memory location and the clock vector of the accessing thread. The facility performs step 604 as a recognition that, by writing information to the accessed memory location, the accessing thread could have stored in the accessed memory location information that is based on its current state, or the state of any other thread of which the accessing thread is currently aware. This information may be later obtained and used by any thread that subsequently reads the accessed memory location. For example, for the access operation performed at time 6 by thread 2 that involves writing to location C, the facility determines the new clock vector state <4, 6> for location C at time 6 in column 718 by performing a component-wise maximum of the clock vector state for location C at times 0-5, <0, 0>, and the clock vector state for thread 2 at time 6, <4, 6>. In some embodiments, if a clock vector does not exist for the accessed memory location, the facility creates and initializes a new clock vector for the accessed memory location as part of step 604. After step 604, the facility continues in step 601 to trap the next access operation.

In step 605 where the access operation is a read, the facility modifies the clock vector of the accessing thread based upon the clock vector of the accessed memory location. In particular, the facility sets the clock vector for the accessing thread to be the component-wise maximum of the current clock vector for the accessing thread and the clock vector for the accessed memory location. The facility performs step 605 as a recognition that, by reading information from the accessed memory location, the accessing thread could have obtained and used information stored in the accessed memory location by any earlier writer to the accessed memory location that reflects the writing thread's state on writing, as well as the state of any other thread of which the writing thread is then aware. For example, for the access operation performed at time 2 by thread 1 that involves reading from location B, the facility determines the new clock vector state <2, 0> for thread 1 in the box for time 1 in column 714 by performing a component-wise maximum of the current clock vector state for accessing thread 1, <1, 0>, and the clock vector state for location C, <0, 0, 0>. After step 606, the facility continues in step 601 to trap the next access operation.

Figure 8:
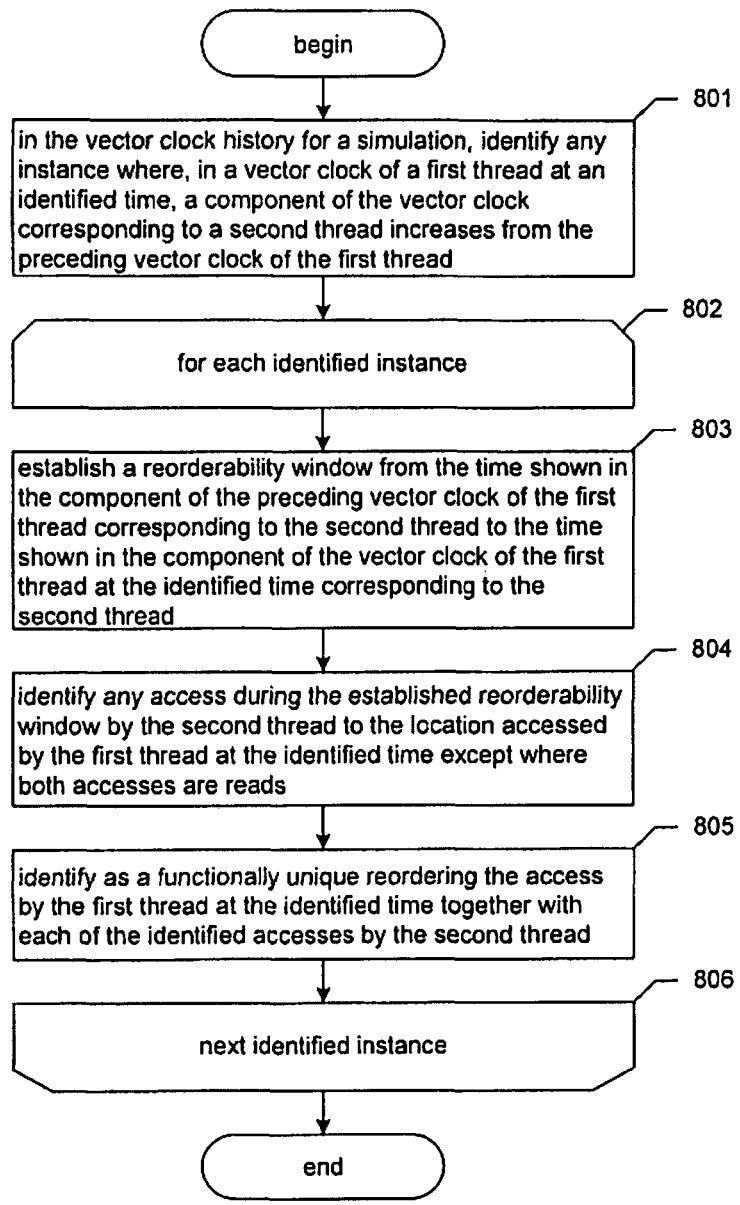
FIG. 8 is a flow diagram showing steps typically performed by the facility in some embodiments to identify functionally distinct reorderings using the vector clock history for simulation.

FIG. 8 is a flow diagram showing steps typically performed by the facility in some embodiments to identify functionally unique schedules using the vector clock history for a simulation. In step 800, the facility identifies in the vector clock history for a simulation any instance where, in the vector clock of a first thread at an identified time, a component of the vector clock corresponding to a second thread increases from the preceding vector clock of the first thread. By reviewing FIG. 7, it can be seen that there is one such instance in the sample vector clock history; the increased thread vector clock component for this instance is underlined. In steps 802-806, the facility loops through each instance identified in step 801. In step 803, the facility establishes a reorderability window for the instance. The established window extends from the time shown in the component of the preceding vector clock of the first thread corresponding to the second thread to the time shown in the component of the vector clock of the first thread at the identified time corresponding to the second thread. In the example, the reorderability window extends from time 0 to time 4. In step 804, the facility identifies any accesses that are within the reorderability window established in step 803, that are by the second thread, and that are to or from the location that is accessed by the first thread at the identified time, except where the accesses by both the first and second threads are reads. In the example, the facility identifies the exchange operations by thread one at times 1 and 4. In step 805, the facility identifies as a functionally unique a reordering or the access by the first thread at the identified time, together with each of the access by the second thread identified in step 804. In the example, the facility identifies the following two reorderings as functionally unique reorderings: a reordering of the exchange by thread 2 at time 5 with the exchange by thread 1 at time 1, and a reordering of the exchange by thread 2 at time 5 with the exchange by thread 1 at time 4. In step 806, if the additional identified instances remain to be processed, then the facility continues in step 802 to process the next identified instance, else these steps conclude. In the example, the facility identifies one-third as many functionally distinct reorderings as identified by a more naïve approach to selecting reorderings to consider pursuing in a simulation. Accordingly where there was a concurrency bug that could only be exposed by simulating a path incorporating a single possible reordering that is a functionally distinct reordering, the facility is three times as likely to discover the concurrency bug if it pursues paths based on functionally distinct reorderings than it is if it pursues paths based on all possible reorderings.

Figure 9:
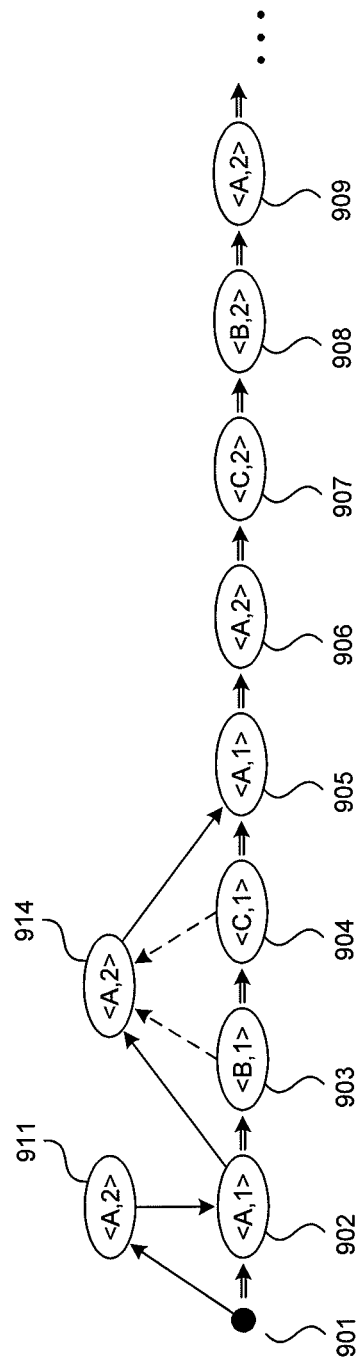
FIG. 9 is a sample path diagram showing paths containing functionally distinct reorderings identified by the facility.

FIG. 9 is a sample path diagram showing paths containing functionally distinct reorderings identified by the facility. The path diagram shows in double lines the scheduled pursued by the facility in the preceding simulation as shown in FIG. 7. In particular, each of the accesses 902-909 corresponding to accesses shown in columns 712 and 713 of FIG. 7. As described above in connection with FIG. 8, and the example shown in FIG. 7, the facility identified two functionally distinct reorderings that each lead to a functionally distinct schedule: reordering the exchange of A by thread 2 at time 5—access 911 in FIG. 9—to occur before the exchange of A performed at time 1 by thread 1—shown as access 902; and reordering the exchange of A at time 5 by thread 2—shown as access 914—before the exchange of A at time 4 by thread 1—access 905. Also shown as broken single lines are possible schedules that are based upon interleavings not found by the facility to be functionally distinct, such as those in which access 914 occurs after access 903 or 904. In some embodiments, the facility makes only path schedules based upon the two functionally distinct schedules available for selection for the next simulation.

Figure 10:
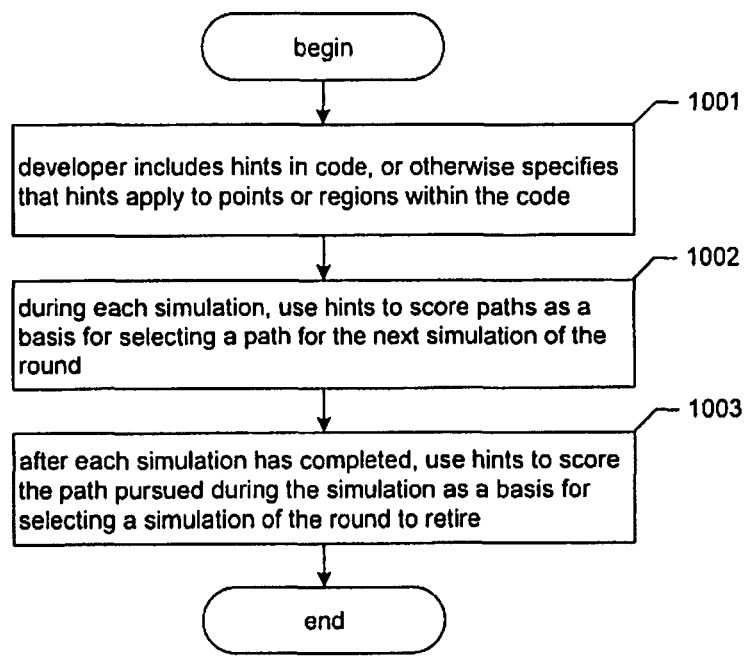
FIG. 10 is a flow diagram showing steps typically performed by the facility in some embodiments in order to employ hinting to guide the exploration performed by the facility.

FIG. 10 is a flow diagram showing steps typically performed by the facility in some embodiments in order to employ hinting to guide the exploration performed by the facility. Such hinting is sometimes referred to as "paravirtualized speculation hinting." In step 1001, the developer of the program includes hints in the program's code. In some embodiments, the developer also or instead specifies that particular hints apply to either points or regions within the code without modifying the code, such as by storing indications of the hints separately from a code with some form of index into the code that can be used by the facility to identify the particular point or region twitch and applies, such as instruction counts, instruction signatures, etc. In various embodiments, the hints established for the program in step 1001 can be of a variety of types. One type of hint recognized by the facility in some embodiments is assertions. Each assertion specifies a condition that the developer always expects to be true when execution reaches the point in the program where the assertion is placed. For example:

```
...
price=*A;
Assert (price >=0);
ChargeCustomer (quantity*price);
...
```

By including the assertion in this code snippet, the developer is indicating that something has gone wrong if the value for the variable price, retrieved from location A, is negative. In some cases, the facility leverages assertions added to the code by the developer for a purpose other than guiding exploration, such as for use with a debugger. An example of such assertions that are leveraged in some embodiments is a language level assertion. In some embodiments, the facility causes a compiler or a compiler pre-processor to substitute specialized simulation hinting assertions for language-level assertions.

One type of hint recognized by the facility in some embodiments is hints relating to a level of interestingness of code near a point or within a region, referred to herein as "code interestingness hints." Interestingness hints may be either positive, indicating that nearby code is interesting and nearby schedules should be explored, or negative, indicating that nearby code is not interesting and nearby schedules should not be explored. In some embodiments, the facility can specify weightings for interestingness hints, particularly positive interestingness hints, indicating how interesting code nearby the hint is. In some embodiments, interestingness hints are further subdivided, such as into a class where the nearby code is interesting because it is sensitive, as contrasted with another class where the nearby code is interesting because it is expected to be rarely executed. In some embodiments, hints, such as interestingness hints, can be conditional, such as a hint that specifies that code near a certain point is interesting if, at that point in the program's execution, the available resources of a certain type is below a specified threshold.

It is typical to add a hint relating to a particular point in the code by adding a single function call specifying the type of hint to the code at the point in question. For example:

```
...
InterestingPoint( )
average_price=price/0;
...
```

It is typical to add a hint relating to a particular region of code by adding two different function calls specifying the type of the hint to the code, one at the beginning of the region and one at the end of the region. For example:

```
...
BeginInterestingRegion(23);
price=*A;
quantity=*B;
EndInterestingRegion(23);
...
```

One type of hint recognized by the facility in some embodiments is hints relating to a level of interestingness of a piece of data or a data structure, referred to herein as "data interestingness hints." It is typical to add a data interestingness hint relating to a particular piece of data or data structure by adding a function call specifying the type of hint to the code adjacent to the declaration for the data or data structure. For example:

```
...
int foo;
InterestingnessData( )
...
```

One type of hint recognized by the facility in some embodiments is "directive hints," which specify that particular schedules of memory accesses should occur, either during all simulations or during a particular percentage of simulations. In some embodiments, the developer adds such a directive hints to the code by adding hints at the beginning and end of a region of code executed by first thread, and adding a third hint to a point in code executed by a second thread that indicates that the second thread should be suspended at the point of the third hint until the first thread finishes executing the region defined by the first two hints.

In some embodiments, the facility automatically adds hints to the code in response to actions by users. For example, in some embodiments, where a user uses a debugger to establish a watch point for a piece of data or data structure, the facility automatically adds a data interestingness hint for that data or data structure. As another example, in some embodiments, in response to a user using a debugger to add a break point to the program's code at a particular point, the facility automatically establishes a code interestingness hint at that point.

Returning to FIG. 10, in step 1002, during each simulation, the facility uses some or all of the code and/or data hints it encounters while executing the simulation to score paths that are related to the path pursued during the current simulation. These scores are then used by the facility in step 3010 to select a path to be pursued in a future simulation. In some embodiments, the facility uses some or all of interestingness hints and directive hints as a basis for scoring paths in step 1002.

Figure 11:
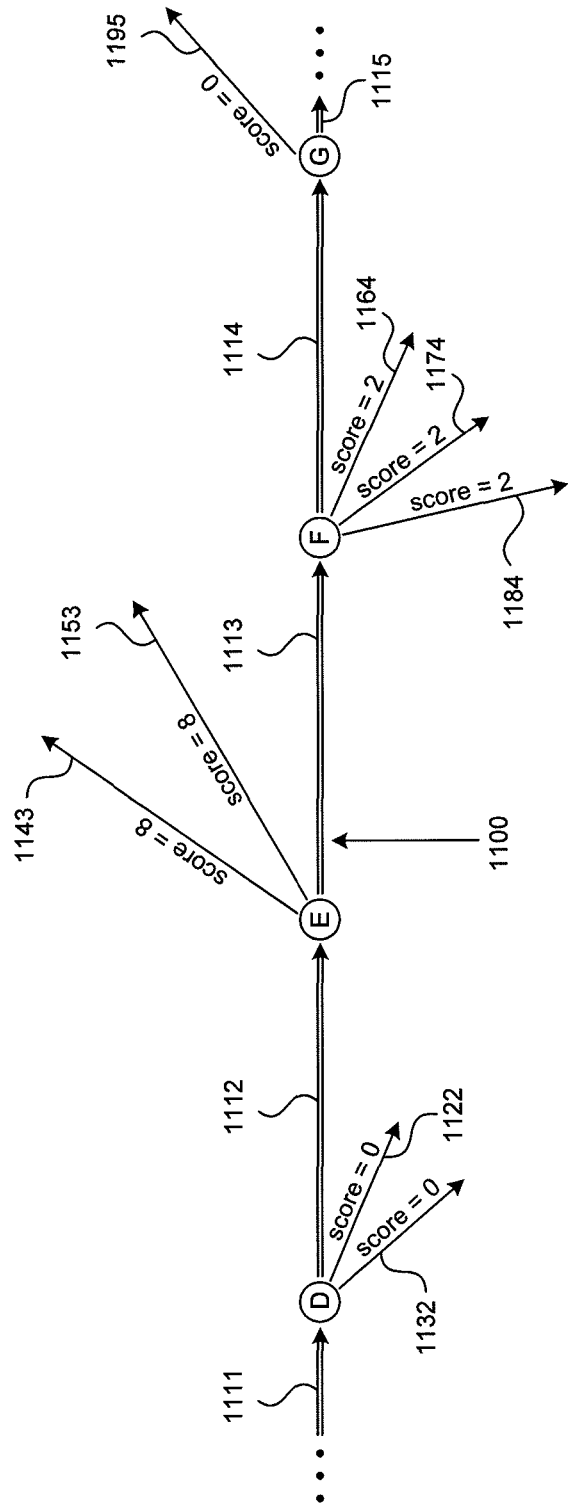
FIG. 11 is a sample path diagram showing path scores established by the facility in some embodiments using hints

FIG. 11 is a sample path diagram showing path scores established by the facility in some embodiments using hints. The path diagram shows in double lines the path pursued by the facility in the preceding simulation, made up of schedules 1111, 1112, 113, 1114, and 1115. As described above in connection with FIG. 8, the facility identified functionally distinct reorderings that lead to several other possible schedules: schedules 1122 and 1132 on location D; schedules 1143 and 1153 on location E; schedules 1164, 1174, and 1184 on location F; and schedule 1955 location G. During the simulation, the facility encountered in interestingness hint at point 1100, most proximal to the node for location E, and somewhat less proximal to the node for location F. Accordingly, the facility scores the highest schedules 1143 and 1153 on location E, and scores somewhat less highly schedules 1164, 1174, and 1184 on location F. In some embodiments, the facility uses these scores to select among the shown additional schedules for the next simulation by randomly selecting among the schedules when weighted with their scores. Under this approach, only schedules on locations E and F can be selected, and each of the schedules on location E is four times as likely to be selected as each of the schedules on location F.

Returning to FIG. 10, in step 1003, after each simulation has completed, the facility uses some or all of the hints include in the code in step 1001 to score the path pursued during the simulation as a basis for selecting a simulation of the round to retire. In some embodiments, the facility uses failed assertions as a basis for determining this retirement score for the simulation. In some embodiments, the facility uses crashes or other errors encountered during the simulation as a basis for determining the retirement score for the simulation, including such errors as general protection faults, divide by zero exceptions, accessing a null pointer, etc. after step 1003, these steps conclude.

Figure 12:
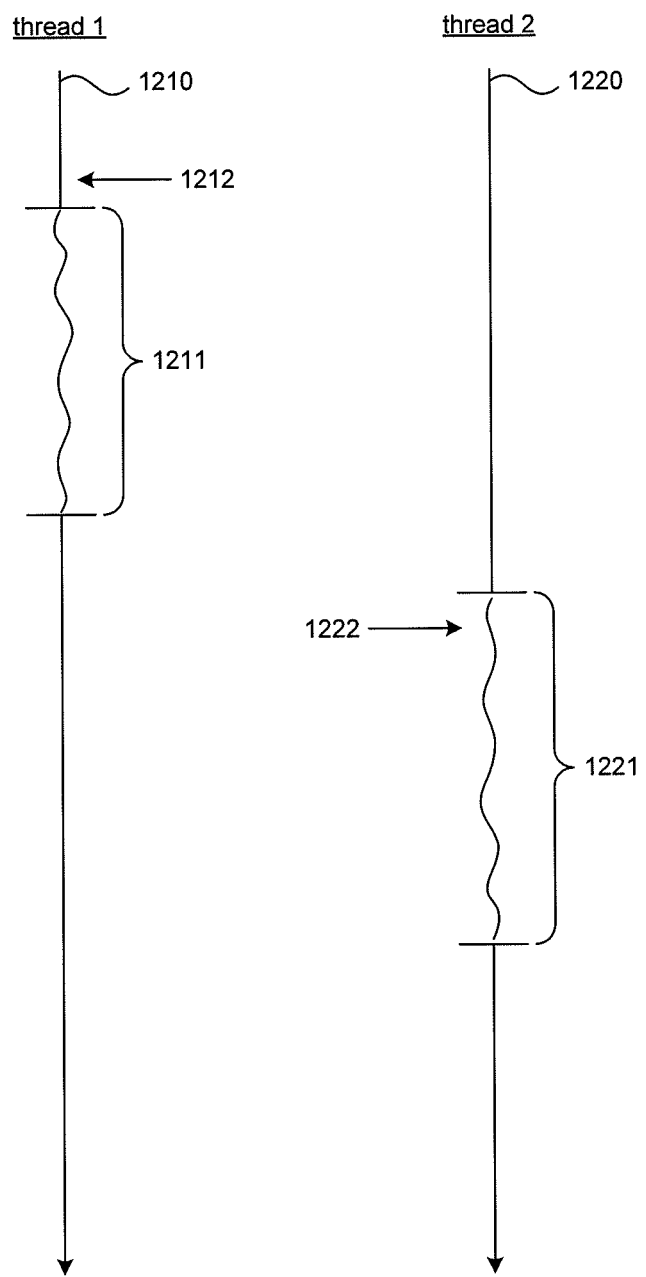
FIG. 12 is the thread timing diagram showing the relative timing of execution of interesting regions by different threads.

In some embodiments, interestingness hints are instead or also used by the facility to choose paths to pursue in future simulations in a different way. In such embodiments, the facility determines at what times during the current simulation interesting points or regions occur in different threads, and designs a future path intended to cause interesting points and regions in different threads to intersect in time. FIG. 12 is the thread timing diagram showing the relative timing of execution of interesting regions by different threads. Timeline 1210 shows the execution schedule for thread 1, and timeline 1220 shows the execution schedule for thread 2. Timeline 1210 shows that thread 1 encounters an interesting region during time period 1211, which is completely distinct from time period 1221 in which thread 2 encounters an interesting region. In these embodiments, the facility designs a path for a future simulation in which thread 1 is suspended when it reaches point 1212, and is only allowed to resume execution when thread to reaches point 1222, thus causing these interesting regions to intersect in time.

In some embodiments, the facility provides a mechanism for delivering at least some types of interrupts to simulations executing on a virtual machine—such as inter-processor interrupts ("IPIs") and timer device interrupts ("TDIs")—and/or permits simulations to continue to execute in the virtual machine through the invocation of an interrupt handler after an interrupt of one of these types occurs. In some embodiments, the facility provides such a mechanism by providing a synthetic advanced programmable interrupt controller ("APIC") that sends and receives IPIs, and/or by providing virtual timers to generate TDIs.

In some embodiments, the facility employs a fully or partly-virtualized advanced programmable interrupt controller ("APIC") that has the ability to send IPIs and deliver and acknowledge incoming IPIs and timer interrupts. Such APIC's effect IPIs by calling an IPI handler callback. A default such callback posts IPIs to the physical APIC.

In some embodiments, the facility prohibits simulation at a time when a pending IPI exists in the physical APIC. In some embodiments, the facility similarly prohibits simulation when any bit is set in the physical APIC IRR.

In some embodiments, when an IPI is sent to a virtual processor executing a thread that is presently suspended by the facility, the facility unsuspends the thread and virtual processor so that the IPI can be acknowledged.

When an IPI is sent to a virtual processor that is presently in a halted or power saving state, the facility unhalts the virtual processor so that the IPI can be acknowledged and appropriate interesting actions taken, such as the scheduling of a new thread on the virtual processor.

In some embodiments, if a simulation sets a bit of the in-service register ("ISR") bit but does not clear it, the facility does not allow that simulation to retire. In some embodiments, the facility enforces this constraint using its simulation scoring mechanism.

In some embodiments, the facility takes steps to avoid suspending any thread and corresponding virtual processor for an extended period of time that may be an IPI target. In some cases, the facility achieves this by observing a rule that no thread and associated virtual processor can be suspended in an interval of a predetermined length that begins when an IPI is sent.

In some embodiments, the facility is able to begin a simulation with an ISR bit set in the physical APIC. If the ISR bit is cleared in the simulation by an end of interrupt signal ("EOI"), the facility replays the EOI to the physical APIC during replay of the simulation. If the ISR bit is not cleared by an EOI during the simulation, then the physical APIC is still in the correct state when replay concludes.

In some embodiments, the facility forces additional thread schedules by delaying the delivery of interrupts such as IPIs and TDIs. In some cases, the facility delivers broadcast IPIs to some processors before others, which in some cases can cause the operating system scheduled to create new scheduling combinations. In some embodiments, the facility uses this technique to reorder across a context switch: On a two-processor machine on which thread set (1, 2) is running concurrently before an IPI, and thread set (3, 4) is running concurrently after the IPI; by delaying the IPI to thread 2's virtual processor but delivering it to thread 1's virtual processor, the facility causes thread set (1, 4) to run concurrently, and similarly causes thread set (3, 2) to run concurrently.

In some embodiments, the facility forces additional thread schedules by delaying or creating timer device interrupts (TDIs), so as to manipulate the perceived time the program has spent executing and thus influence the operating system scheduler into creating rare thread scheduling combinations. In other embodiments, manipulation of the operating system scheduler by varying time inputs may be accomplished, or augmented, by accelerating or decelerating the observed passage of time through various virtualized clock devices, such as the real time timestamp counter (TSC).

In some embodiments, the facility speculates based on the state of inputs other than the timing of answer-thread communications, such as input from a variety of devices. In some embodiments, the facility speculates based upon network card inputs in order to perform security testing or fuzz testing. In some embodiments, the facility speculates based upon clock inputs to ensure more complete test coverage. The facility can use the hypervisor to inject these inputs on behalf of devices that cannot easily be simulated by the developer of the program.

While various embodiments are described with reference to multithreaded program code, in some embodiments, the facility identifies bugs and/or generates a replay package for other types of program code, including a single-threaded program executing alone, a single-threaded program running on top of an operating system, a task-based application, operating system code, or the like.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system that, for a multi-threaded program executing on a root machine, causes the threads of the program to be executed in a relative scheduling that produces an interesting result, comprising:
   suspending execution of all the threads of the program on the root machine;
   while execution of all the threads of the program on the root machine are suspended, saving the state of the root machine;
   performing a plurality of simulations each comprising:
      initializing a simulation machine with the saved state;
      determining a set of communication interleavings among threads of the program, wherein, for at least one of the plurality of simulations, determining a set of communication interleavings for the simulation comprises:
         determining an order in which thread communications were performed during execution of the program in a previous simulation;
         identifying at least one possible reordering within the determined thread communications order;
         selecting one of the identified possible reorderings; and determining a set of communication interleavings that
incorporates the selected reordering;
executing the program on the simulation machine in
accordance with the determined set of communication interleavings;
attributing a single score to the simulation based on the
results of execution of the program;
based on a comparison between the various single scores
attributed to each of the simulations, selecting one of the
plurality of simulations; and
resuming execution of the program on the root machine in
accordance with the set of communication interleavings
determined for the selected simulation.

2. The method of claim 1 wherein the root machine is a physical machine.

3. The method of claim 1 wherein the root machine is a virtual machine.

4. The method of claim 1 wherein the root machine is a user-level process.

5. The method of claim 1 wherein the simulation machine is a virtual machine.

6. The method of claim 1 wherein the simulation machine is a physical machine.

7. The method of claim 1 wherein the program is executed in accordance with the determined set of communication interleavings by, for each of one or more threads of the program, suspending execution of the thread at a point before it initiates a communication to another thread.

8. The method of claim 1 wherein the program is executed in accordance with the determined set of communication interleavings by, for each of one or more threads of the program, delaying delivery of the communication to another thread initiated by the thread.

9. The method of claim 1 wherein a plurality of simulation machines are initialized and used to execute the program in accordance with a determined set of communication interleavings.

10. The method of claim 1 wherein communication interleavings include memory access interleavings.

11. The method of claim 1 wherein communication interleavings include interrupts.

12. The method of claim 1 wherein the single score determined for each simulation reflects the extent to which the simulation's execution of the program produces undesirable behavior.

13. The method of claim 1 wherein the single score attributed to at least one of the simulations of the plurality is based at least in part on an error reported by the simulation machine.

14. The method of claim 1 wherein the single score attributed to a selected simulation of the plurality is based at least in part on encountering a failed assertion in the execution of the program during the selected simulation.

15. The method of claim 1 wherein the identification of possible reorderings identifies a proper subset of all possible reorderings that are functionally distinct.

16. The method of claim 15, further comprising, for each of the plurality of simulations, maintaining clock vectors for each thread of the program that are used as a basis for identifying reorderings among the possible reorderings that are functionally distinct.

17. The method of claim 1 wherein the selection of one of the identified possible reorderings is based at least in part on the extent to which each of the identified possible reorderings relates to a portion of the code of the program explicitly identified by its developer as interesting.

18. The method of claim 1, further comprising:
storing a package containing the saved state and an indication of the set of communication interleavings determined for the selected simulation;
initializing a replay machine with the saved state from the package; and
executing the program on the replay machine in accordance with the set of communication interleavings determined for the selected simulation indicated by the package.

19. A computer-readable memory device whose contents are capable of causing a computing system to perform a method that, for a multithreaded program executing on a root machine, causes the threads of the program to be executed in a relative scheduling that produces an interesting result, the method comprising:
suspending execution of all the threads of the program;
testing a plurality of communication interleavings on one or more virtual machines and observing the result of each test, wherein at least one of the tests comprises determining a set of communication interleavings for the test by:
determining an order in which thread communications were performed during a previous test;
identifying at least one possible reordering within the determined thread communications order;
selecting one of the identified possible reorderings; and
determining a set of communication interleavings that incorporates the selected reordering;
attributing a single score to each test based on an extent to which the test produced an undesirable behavior;
based on a comparison between the various single scores attributed to each of the tests, selecting one of the tested relative thread schedulings; and
resuming execution of the program using the selected relative thread scheduling.

20. The computer-readable memory device of claim 19 wherein testing at least one of the plurality of relative thread schedulings comprises executing through an interrupt to an interrupt handler.

21. The computer-readable memory device of claim 19 wherein testing at least one of the plurality of relative thread schedulings comprises executing through a physical device access.

22. The computer-readable memory device of claim 19 wherein testing at least one of the plurality of relative thread schedulings comprises executing through a logical device access.

23. One more computer memories collectively storing a data structure relating to a multithreaded program whose threads each access memory locations, the data structure comprising:
for each of one or more memory locations,
a prescribed order of communication interleavings in which the threads access the memory location;
wherein:
the prescribed order of communication interleavings is based on a previous distinguished execution of the program in a virtual machine in which the prescribed order of communication interleaves was selected by:
determining an order in which thread communications were performed during an earlier execution of the program;
identifying at least one possible reordering within the determined thread Communications order;
selecting one of the identified possible reorderings; and
determining a set of communication interleavings that incorporates the selected reordering;

the distinguished execution implemented threads accessing the memory location in the prescribed order;

the distinguished execution was attributed a single first score that indicated an extent to which the distinguished execution was interesting;

the distinguished execution was selected from among a plurality of other executions, each of the other executions having exactly one attributed score indicating an extent to which each other execution was interesting, wherein the scores attributed to the other executions comprise a set of second scores;

the selection of the distinguished order was based on a comparison between the single first score and scores in the set of second scores, the comparison determining that the distinguished execution produced the most interesting result; and the contents of the data structure can be used to reproduce the more interesting result in a virtual machine other than the distinguished virtual machine.

24. One or more data transmission hardware devices configured to collectively convey a data structure relating to a multithreaded program whose threads each access memory locations, the data structure comprising:

for each of one or more memory locations,
a prescribed order of communication interleavings in which the threads access the memory location;

wherein:

the prescribed order communication interleavings is based on a previous distinguished execution of the program in a simulation machine, in which the prescribed order of communication interleavings was selected by:

determining an order in which thread communications were performed during an earlier execution of the program;

identifying at least one possible reordering within the determined thread communications order;

selecting one of the identified possible reorderings; and determining a set of communication interleavings that incorporates the selected reordering;

the distinguished execution implemented threads accessing the memory location in the prescribed order;

the distinguished execution was attributed a single first score that indicated an extent to which the distinguished execution was interesting;

the distinguished execution was selected from among a plurality of other executions, each of the other executions having exactly one attributed score indicating an extent to which each other execution was interesting, wherein the scores attributed to the other executions comprise a set of second scores;

the selection of the distinguished order was based on a comparison between the single first score and scores in the set of second scores, the comparison determining that the distinguished execution produced the most interesting result; and the contents of the data structure can be used to reproduce the most interesting result in a machine other than the simulation machine.

\* \* \* \* \*

UNITED STATES PATENT AND TRADEMARK OFFICE
CERTIFICATE OF CORRECTION

| | | |
|---|---|---|
| PATENT NO. | : 9,009,020 B1 | Page 1 of 1 |
| APPLICATION NO. | : 13/047716 | |
| DATED | : April 14, 2015 | |
| INVENTOR(S) | : Mark H. Oskin et al. | |

It is certified that error appears in the above-identified patent and that said Letters Patent is hereby corrected as shown below:

On the title page, in the illustrative figure, Reference Numeral 309, line 1, "simluation" should read -- simulation --.

In the Drawings

On sheet 3 of 12, in Figure 3, Reference Numeral 309, line 1, delete "simluation," and insert -- simulation, --, therefor.

In the Specification

In column 2, line 30, delete "hints" and insert -- hints. --, therefor.

In column 4, line 12, delete "thread 1>}" and insert -- thread 1>}. --, therefor.

In column 15, line 41, delete "InterestingPoint()" and insert -- InterestingPoint(); --, therefor.

In column 15, line 64, delete "InterestingnessData( )" and insert -- InterestingnessData( ); --, therefor.

In the Claims

In column 20, line 59, in claim 23, delete "interleaves" and insert -- interleavings --, therefor.

In column 20, line 64, in claim 23, delete "Communications" and insert -- communications --, therefor.

In column 21, line 29, in claim 24, after "order" insert -- of --.

In column 22, line 1, in claim 24, delete "machine," and insert -- machine --, therefor.

Signed and Sealed this
Twentieth Day of October, 2015

Michelle K. Lee
*Director of the United States Patent and Trademark Office*